O. C. NUUBSON & J. A. NUBSON.
DOUGH SHEETING MACHINE.
APPLICATION FILED MAY 4, 1915. RENEWED MAR. 21, 1917.
1,225,481.
Patented May 8, 1917.
3 SHEETS—SHEET 2.
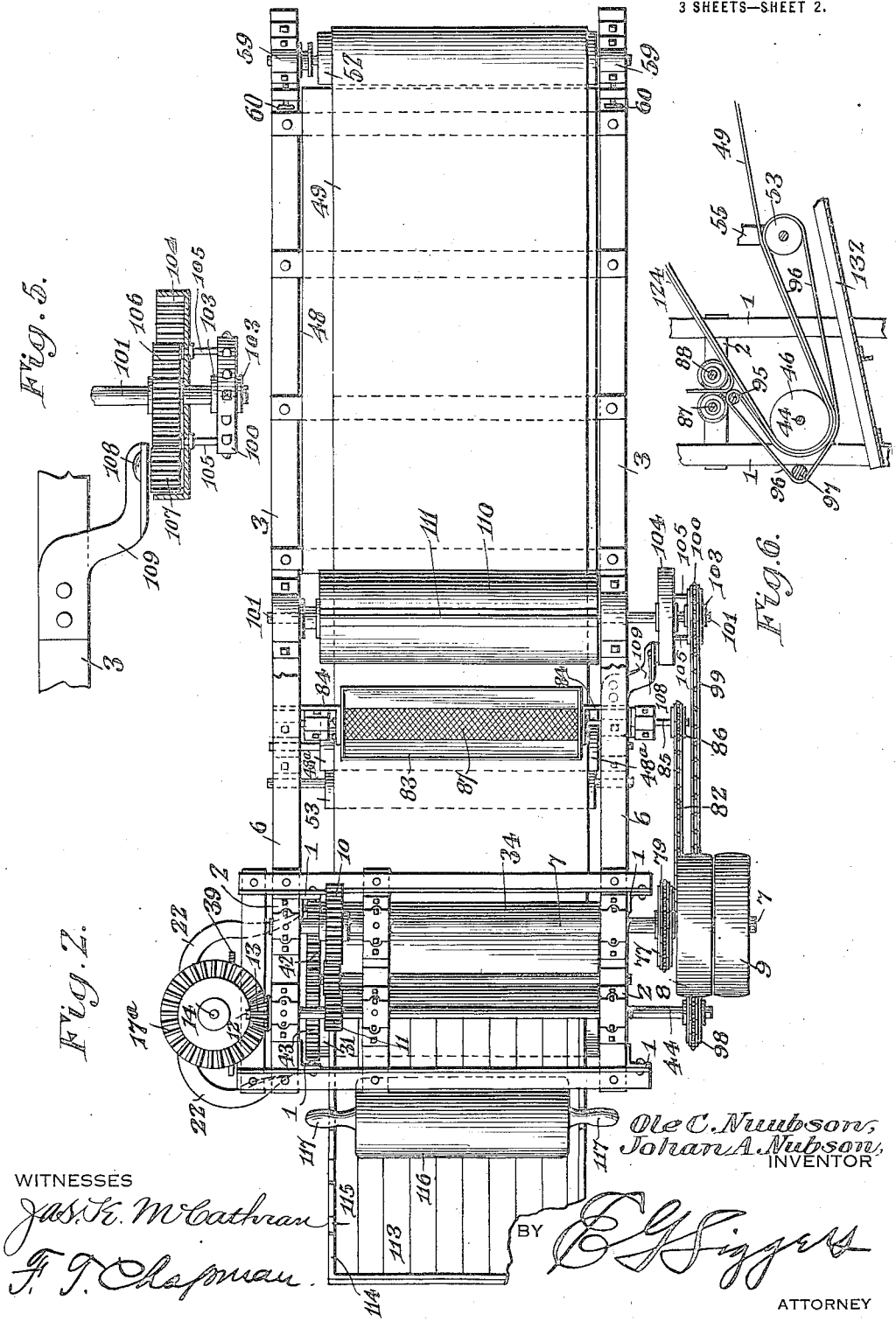

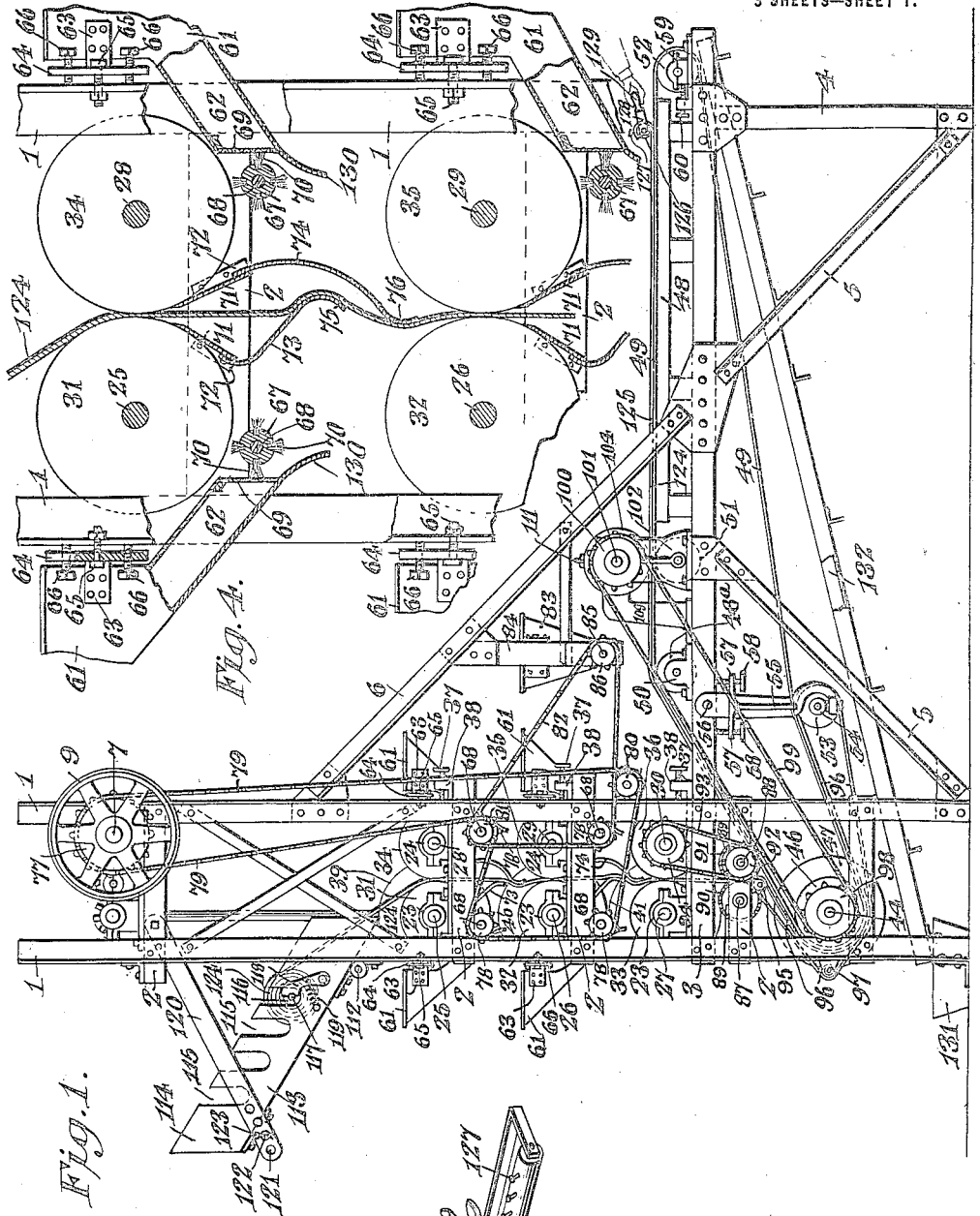

O. C. NUUBSON & J. A. NUBSON.
DOUGH SHEETING MACHINE.
APPLICATION FILED MAY 4, 1915. RENEWED MAR. 21, 1917.
1,225,481.
Patented May 8, 1917.
3 SHEETS—SHEET 3.
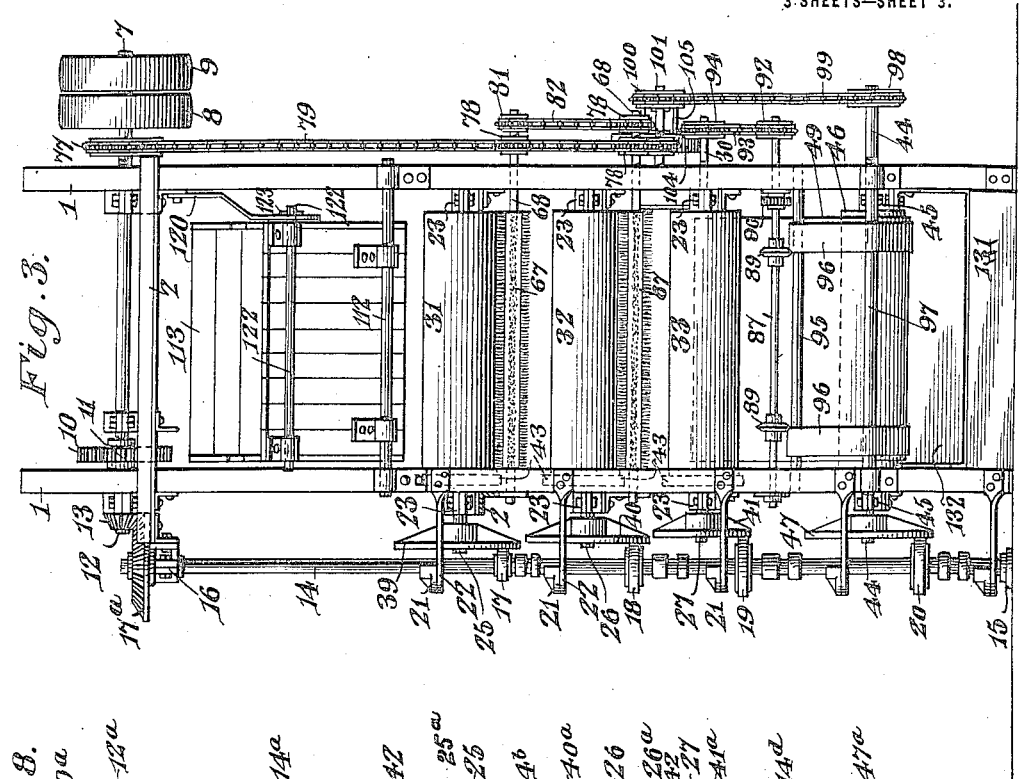
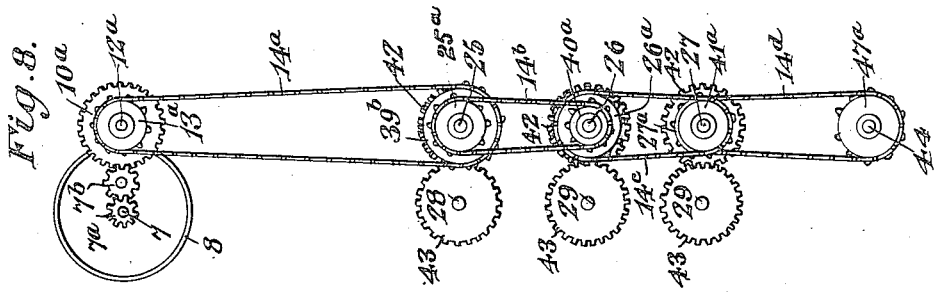
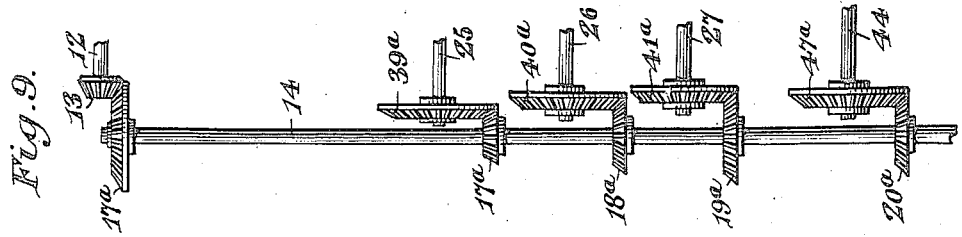
WITNESSES
Ole C. Nuubson,
Johan A. Nubson, INVENTORS
BY
ATTORNEY

UNITED STATES PATENT OFFICE.

OLE C. NUUBSON AND JOHAN A. NUBSON, OF DULUTH, MINNESOTA.

DOUGH-SHEETING MACHINE.

1,225,481.          Specification of Letters Patent.     Patented May 8, 1917.

Application filed May 4, 1915, Serial No. 25,796. Renewed March 21, 1917. Serial No. 156,459.

*To all whom it may concern:*

Be it known that we, OLE C. NUUBSON, a subject of the King of Norway, and JOHAN A. NUBSON, a citizen of the United States, residing at Duluth, in the county of St. Louis and State of Minnesota, have invented a new and useful Dough-Sheeting Machine, of which the following is a specification.

This invention has reference to dough sheeting machines, and is designed to form dough into sheets of suitable thickness and to cut the sheets into lengths suitable for baking into a form commercially known as flat bread, and especially in connection with a machine such as shown and described in Reissue Letters Patent No. 13,808, granted to one of us, namely, Ole C. Nuubson, on October 13, 1914.

In accordance with the present invention the dough is preliminarily rolled out into sheets of considerably greater thickness than the ultimate product of the machine of the present invention, and such dough is then rolled upon a mandrel for further operation. The machine of the present invention is provided with a series of associated rollers between which the dough sheet is directed, the series being an upright series, so that the dough in passing between the pairs of rollers of the series travels in a downward direction. Provision is made for supporting the dough sheet in its travel from one pair of the series to the next lower pair so that the weight of the traveling sheet is not sufficient to rupture the dough. Moreover, provision is also made for preventing the dough from sticking to the rollers and for applying flour to opposite faces of the dough to further aid in preventing sticking.

The dough in its passage through the series of rollers becomes reduced in thickness to the desired extent and is thereupon directed to a traveling apron which carries it to a table which may be arranged horizontally. After leaving the rollers and before reaching the table the sheet of dough is subjected to the action of trimming means, usually in the form of rotating cutters, whereby the dough sheet is made of the requisite width with the side edges parallel. On reaching the table the traveling dough sheet is periodically subjected to a severing means whereby the sheet is cut into desired lengths appropriate for the baking machine, and after the dough sheet is thus severed it may be readily picked up by a suitable tool allowing the transportation of the sheet to the baking machine and its deposition thereon.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—

Figure 1 is a side elevation of the dough sheeting machine of the present invention with some parts omitted.

Fig. 2 is a plan view thereof.

Fig. 3 is an end elevation as viewed from the left hand end of Fig. 1.

Fig. 4 is a fragmentary vertical section through a portion of the series of dough treating rollers and adjacent parts, with some portions broken away, and other portions nearer to the observer shown in elevation.

Fig. 5 is a sectional view of a motion-reversing gearing employed in conjunction with the dough severing mechanism.

Fig. 6 is an elevation, partly in section, of a portion of the machine below the series of dough treating rollers.

Fig. 7 is a perspective view of a dough lifting device.

Fig. 8 is a view of a driving mechanism for the rollers which may replace that shown in Fig. 1 and associated figures.

Fig. 9 is still another form of roller-driving mechanism from that shown in Fig. 8.

Referring to the drawings there is shown a frame composed of uprights or posts 1 and connecting members 2 and other connecting members 3 for the posts prolonged to one side of the connected posts and supported at the end remote from the posts by legs 4 and suitably stiffened by braces 5, 6, the braces 6 being connected at one end to the beams 5 and at the other end to certain of the posts 1 at a high point thereon.

The posts 1 provide an upright frame, near the top of which there is journaled a shaft 7 carrying tight and loose pulleys 8, 9, whereby power may be applied to the shaft by a drive belt, but it will be understood that the shaft 7 may be driven by any power directly or indirectly applied. In the particular showing of the drawings the shaft 7 is continued across the upright frame to the side thereof remote from the pulleys 8 and 9, and there carries a gear wheel 10 in mesh with another gear wheel 11 on a shaft 12 suitably journaled in the upright frame and provided exterior to said frame on the end of the shaft 12 remote from the gear wheel 11 with a bevel pinion 13.

Arranged alongside of the upright frame in spaced relation to that side of the frame remote from the pulleys 8 and 9 is an upright shaft 14 having a step bearing 15 at the lower end and provided at the upper end with a journal support 16, and above the latter with a bevel gear 17a in mesh with the pinion 13, whereby the shaft 14 receives power from the drive pulley 8.

At appropriate points on the shaft 14 are friction wheels 17, 18 and 19, respectively. The friction wheel 17 is relatively small, the friction wheel 18 is larger, and the friction wheel 19 is the largest of the three. The three friction wheels 17, 18 and 19 are disposed along the shaft 14 in the order named with the smaller friction wheel at a higher point than the larger friction wheel. At a still lower point the shaft 14 carries another friction wheel 20 to which reference will hereinafter be made.

At appropriate points along the shaft 14 it is engaged by bearing blocks 21 held to one of the uprights 1 by brackets 22. The blocks 21 are designed to resist any side thrust tending to force the shaft 14 away from the upright frame.

Mounted in journal bearings 23, 24 at appropriate points along the upright frame, and particularly where capable of support by the cross pieces or beams 2 and 3, are transverse shafts 25, 26 and 27 carried by the journal bearings 23 and other transverse shafts 28, 29 and 30 carried by the journal bearings 24. The shafts 25, 26 and 27 carry rollers 31, 32 and 33, respectively, and the shafts 28, 29 and 30 carry similar rollers 34, 35 and 36, respectively.

The journal bearings 23 may be fixed, while the journal bearings 24 are adjusted toward and from the journal bearings 23 by means of adjusting screws 37 threaded through appropriate brackets 38 on the beams 2 and 3, whereby the rollers 34, 35 and 36 may be adjusted toward and from the rollers 31, 32 and 33, respectively, for a purpose which will hereinafter appear.

At that end of the shaft 25 toward the shaft 14 there is secured a friction disk 39 and the shafts 26 and 27 carry friction disks 40 and 41, respectively, these disks varying in size in inverse proportion to the differences in size of the friction rollers 17, 18 and 19, and the friction disks are in driving relation to the friction wheels.

The rollers 31, 32 and 33 are each connected to the companion rollers 34, 35 and 36 by intermeshing gear wheels 42 and 43, so that the rollers of each pair rotate oppositely at the same speed, although because of the different sizes of the friction wheels and companion friction disks of the different pairs of rollers the upper pair of rollers consisting of the rollers 31 and 34 rotate at a slower speed than the next lower pair of rollers 32 and 35, while the lowest pair of rollers 33 and 36 have the highest speed of rotation of the series. This difference of speed of rotation as to the different pairs of rollers of the series is for a purpose which will hereinafter appear.

The rollers of the upright series of rollers are located one above the other, and below the series and mounted in the upright frame to one side of the upright center line of the series of rollers is a shaft 44 having journal bearings 45 on suitable connectors or beams 2 joining the upright beams 1 and located near the bottom ends of these beams. The shaft 44 carries a drum 46 between the journal bearings and is extended to one side of the upright frame where it carries a friction disk 47 in frictional engagement with the friction wheel 20, so that the shaft 44 receives motion from the shaft 14.

Mounted on the beams 3 where extended away from the upright frame is a table 48 over which travels one run of an endless apron 49. This apron is carried about the drum 46 which is located at a lower point than the table 48 and from thence the apron passes about a supporting and direction-changing roller 48a mounted in bearings 50 carried by the beams 3, from which roller the apron passes over another roller 51 close to one end of the table 48 and over still another roller 52 at the other end of the table, the apron returning to the drum 46 beneath the table 48 and the beams 3, the return or lower run of the apron passing over a supporting roller 53 supported in journal bearings 54 on hangers 55 pivoted to and depending from the beams 3 by pivots 56. The hangers 55 have side extensions 57 through which are threaded set screws 58 permitting a rocking movement of the hangers for a purpose which will hereinafter appear. The roller 52 is mounted in bearings 59 controlled by set screws 60 whereby the bearings 59 may be moved lengthwise of the beams 3 to suitably tension the apron 49.

Adjacent to each roller 31, 32, 34 and 35 is a flour bin 61 having a spout continuation 62 ending at a point below the respective roller. Each bin 61 is carried at opposite ends by brackets 63 fast to rocker arms 64 secured to a respective post 1 by a bolt 65 or other convenient means. On opposite sides of the bolt 65 each rocker arm 64 has threaded through it a set screw 66.

Extending lengthwise of and below each roller 31, 32, 34 and 35 is an elongated rotary brush 67 carried by a shaft 68 having appropriate journal bearings in the upright frame. At the lower end of each spout continuation 62, such spout in operative position slanting downwardly toward the brush 67, is a closure 69 of wire or other screen cloth which by adjustment of the screws 66 may be brought into a desired relation to the brush 67, which latter may have tufts 70 of bristles.

Extending transversely of each roller 31, 32, 34 and 35 is a scraper blade 71 carried by brackets 72 made fast to appropriate ones of the transverse beams of the upright frame, and these scraper blades are arranged to engage the respective rollers at points a short distance below the points of close approach of the rollers.

The brackets 72 carry shelves 73 and 74 on opposite sides of the upright center line passing between the respective pairs of rollers. Each shelf 73 is appropriately bent and terminates in a convexly curved edge 75 and each shelf 74 terminates in a convexly curved edge 76, both shelves being more or less pendently arranged with the end 76 of the shelf 74 lower than the end 75 of the shelf 73, and these curved edges are disposed on relatively opposite sides of an upright center plane extending between the approaching faces of the sets or pairs of rollers. The purposes of these structures will appear hereinafter.

Each shaft 68 is extended beyond the same side of the upright frame as is the shaft 7 where carrying the pulleys 8 and 9. The shaft 7 has a sprocket wheel 77 mounted thereon and the shafts 68 have each a sprocket weel 78 mounted thereon. Extending about the sprocket wheel 77 is a sprocket chain 79 also carried about the sprocket wheels 78 on the shafts 68 beneath the rollers 31, 32 and 33, the course of the chain being such that the brushes 67 have those portions engaging the screens 69 there moving downwardly.

In order that the course of the chain 79 may be properly directed it is also carried about an idler sprocket wheel 80 appropriately located to direct the return run of the chain 79 after passing about the stated sprocket wheels 78.

Mounted on the brush shaft 68 beneath the roller 34 is another sprocket wheel 81 about which there extends a sprocket chain 82 carried about the sprocket wheel 78 on the brush shaft 68 under the roller 35.

Carried by the brace 6 is another flour bin 83 supported by hangers 84 and underridden by a brush like the brushes 67, such brush being supported upon a shaft 85 carrying a sprocket wheel 86 about which the sprocket chain 82 is directed. The bin 83 has its lower discharge end covered by wire cloth or other screen 87 so that the brush beneath it acts in the same manner with respect to the flour within the bin 83 as do the brushes 67 with respect to flour within the bins 61. The bin 83 is so situated as to override that portion of the apron 49 just after it leaves the supporting roller 48ª and before it reaches the supporting roller 51.

Beneath the pair of rollers 33 and 36 and above the apron 49 where moving below said rollers are two adjacent shafts 87, 88, suitably journaled in cross pieces 2 of the upright frame. These shafts carry coacting cutter wheels 89 in suitably spaced relation, and the shafts are connected for rotation in opposite directions by gear wheels 90, 91, respectively. The shaft 88 is continued at one end beyond the frame and there carries a sprocket wheel 92 connected by a chain 93 to another sprocket wheel 94 on the shaft 30 carrying the roller 36, whereby motion is imparted to the trimming cutters 89.

Extending about an elongated direction-changing roller 95 mounted in the upright frame beneath the shafts 87 and 88 are aprons 96 each having one run extended about another direction-changing roller 97 mounted on one side of the upright frame, while the other runs of these aprons are carried about the roller 46, and ultimately reach the roller 53 and travel in the same direction as the apron 49.

The shaft 44 at the end remote from the friction wheel 47 projects a suitable distance beyond the upright frame and there carries a sprocket wheel 98 connected by a sprocket chain 99 to another sprocket wheel 100 on a shaft 101 mounted in standards 102 in which also the supporting roller 51 is mounted.

The sprocket wheel 100 is mounted to turn freely on the shaft 101 being held against longitudinal movement thereon by suitable collars 103 or in any other appropriate manner. The sprocket wheel 100 is made fast to and spaced from an internal gear wheel 104 by connecting studs 105. The gear wheel 104 may also be mounted upon the shaft 101 to turn loosely thereon, while concentric with the gear wheel 104 is another gear wheel 106 made fast to the shaft 101. Interposed between the gear wheel 104 and the gear wheel 106 is a pinion 107, whereby motion is transmitted from the gear wheel 104 to the gear wheel 106. The pinion 107 is mounted on a stud 108 carried by a bracket 109 in turn carried by an appropriate one of the beams 3.

Mounted on the shaft 101 so as to turn therewith is a roller 110 in coactive relation to the roller 51, and between the rollers 51 and 110 the upper run of the apron 49 travels.

Carried by the peripheral portion of the roller 110 longitudinally thereof is a dough cutting blade 111 projecting radially from the roller 110, so as to reach or approximately reach the apron 49 across the space separating the surface of the rollers 51 and 110.

Hinged to uprights 1 of the upright frame by a hinge rod 112 is a shelf 113 having sides 114 with a series of notches or recesses 115 therein. These notches are designed to receive the ends of a mandrel 116 having axially projecting pins 117 at the ends to each receive one end of a pivoted finger 118 constrained in one direction by a spring 119. The purpose of the fingers 118 which are appropriately notched to receive the pins 117, is to hold the mandrel 116 in the appropriate notches without liability of escape therefrom, said notches serving as journal supports for the mandrel 116.

The shelf 113 is carried near the end remote from the hinge 112 by a link 120 pivoted at one end to one of the cross bars 2 near the top of the upright frame, and at the other end provided with a series of perforations 121, any one of which may be traversed by one end of a rod 122 carried by the shelf 113 and a cotter pin 123 or other suitable device may serve to hold the link 120 to the rod 122.

In preparing the machine for forming the dough sheets, the dough, indicated at 124, is first rolled out into relatively thick sheets, and then wrapped about the mandrel 116 to be then placed upon the shelf 113.

The end of the dough sheet 124 is introduced between the upper pair of rollers 31, 34, and it being assumed that the machine is in operation and that flour is deposited in the several bins 61 and the bin 83, the dough sheet travels between the rollers 31 and 34 being there reduced in thickness. After passing between the rollers 31 and 34 the thinned dough sheet first comes in contact with the end 75 of the shelf 73, whereby its course of travel is deflected to one side of the upright center line of travel and then the dough sheet reaches the curved edge 75 of the shelf 74, whereby the travel of the sheet is deflected in the opposite direction and to the other side of the upright center line. The dough sheet thus in part supported by the two shelves 73 and 74 deflecting its course of travel in opposite directions, then reaches the rollers 32 and 35, being at such point still further reduced in thickness. The dough sheet now reaches the second set of shelves 73 and 74 after passing which the sheet is finally subjected to a still further thinning by the action of the pairs of rollers 33 and 36, these last named rollers reducing the dough sheet to the desired thinness. Immediately after passing the rollers 33 and 36 the dough sheet passes between the pairs of cutters 89 whereby the edges are trimmed and the sheet is brought to an even width. After the trimming the dough sheet is directed upon the up-traveling run of the apron 49 on its passage toward the roller 48$^a$ and ultimately the sheet is carried by the apron between the rollers 51 and 110 where at intervals the dough sheet is subjected to the action of the cutting blade 111, whereby the sheet is periodically severed into appropriate lengths, one such severing cut being indicated at 125 in Fig. 1 above the table 48.

Each section of the dough sheet as cut is removed from the apron 49 to a baking machine, such as shown and described in the aforesaid reissued Letters Patent. A convenient means for facilitating the removal of the severed sheet is shown separately in Fig. 7. There is provided a roller 126 with studs 127 thereon, and this roller is carried by a frame 128 having a manipulating handle 129. By applying the studs 127 to one end of the severed sheet it is readily rolled upon the roller 126 and transported to the baking machine.

In order to prevent the dough from sticking to the rollers flour is deposited upon the traveling dough sheet from time to time. This is accomplished by the brushes 67 which are rotated so that their bristle tufts 70 travel across the screens 69, and catching in the flour thereby distributed the latter is directed toward the traveling dough sheet as it approaches the next pair of thinning rollers. To further control the directing of the flour against the sheet, each spout 62 has a projecting lip 130 below the respective brush 67, whereby the flour projected by the brush is directed on to the next lower roller and toward the traveling dough sheet. The scrapers 71 acting on the respective dough thinning rollers scrape off any dough that may strick thereto and so prevent accumulations of dough which might cause subsequent portions of the dough sheet to adhere to the rollers. The bin 83 is so located that flour is dusted on the dough sheet just before reaching the roller 110, and thereby preventing adhesion of the dough sheet to said roller.

The trimmings cut off by the knives 89 are carried by the aprons or belts 96 in a direction away from the main dough sheet until these trimmings drop from the belts or aprons where they pass over the direction-changing roller 97 and a pan or receptacle 131 may be located in convenient position to receive such trimmings.

More or less flour finds lodgment on the apron or belt 49 and to collect such flour which is liable to drop from the lower run of the apron in its return to the drum 46, a chute 132 is mounted in the frame of the machine underneath the lower run of the apron, and this chute may be tilted so that its lower end will discharge into the receptacle 131.

In the arrangement shown in the drawings the chain 99 drives the sprocket wheel 100 in a direction which if the cutter 111 were driven in the same direction would cause it to move oppositely to the direction of travel of the dough sheet, wherefore the gearing 104, 106 and 107 is provided to effect a change of direction of rotation of the cutter 111, so that it coincides in direction of travel with that of the dough sheet upon the apron 49.

Since in its passage through the machine the dough sheet is progressively thinned it becomes correspondingly elongated over its length as rolled upon the mandrel or drum 116. For this reason the dough sheet must travel progressively faster as it passes through the machine, and, therefore, the driving means for the pair of rollers 32 and 35 is arranged to cause a higher speed of rotation of these rollers than of the pair of rollers 31 and 34, while the pair of rollers 33 and 36 have still a higher rate of rotation. The parts are so proportioned that these different rates of rotation all agree with the rate of travel of the dough sheet through the machine, and its progressive increase in speed as it is thinned out.

It is not necessary that friction drive be employed for causing the rotation of the rollers 31, to 36, since the shaft 14 may carry bevel pinions $17^a$, $18^a$, $19^a$, and $20^a$, engaging corresponding bevel pinions $39^a$, $40^a$, $41^a$ and $47^a$, all as shown in Fig. 9, and replacing the friction drive best shown in Fig. 3, it being understood that the various intermeshing bevel pinions are properly proportioned to bring about the desired variations in speed. Again, a sprocket drive such as indicated in Fig. 8 may be used to replace either the friction or the gear drive of Figs. 3 or 9. In this event the shaft 7 carries intermeshing gears $7^a$, $7^b$ transmitting motion from the shaft 7 to a gear $10^a$ on a shaft $12^a$ on which is mounted a sprocket wheel $13^a$, which latter by means of a sprocket chain $14^a$ imparts motion to a sprocket wheel $39^b$ mounted on the shaft 25, and the latter carries another sprocket wheel $25^a$, which by means of another sprocket chain $14^b$ transmits motion to still another sprocket wheel $40^a$ mounted on the shaft 26. Also mounted on the shaft 26 is another sprocket wheel $26^a$ transmitting motion by means of a chain $14^c$ to a sprocket wheel $41^a$ on the shaft 27, while a sprocket wheel $27^a$ on the shaft 27 transmits motion by a chain $14^d$ to a sprocket wheel $47^a$ on the shaft 44. By the sprocket arrangement just described wherein the parts are assumed to be properly proportioned, motion is imparted to the various parts to be driven in the same manner as in the structure of Fig. 3.

By these showings it is evident that the invention is not limited to any particular mode of transmitting motion, so long as the functions performed by the driven parts are attained.

What is claimed is:—

1. A dough sheeting machine comprising an upright series of opposed rollers in pairs and adapted to progressively thin the dough sheet, means for driving the rollers at speeds corresponding to the progressive thinning of the dough sheet, and means projecting across the path of the dough sheet traveling from one pair of rollers to another for supporting the dough sheet and opposing the action of gravity thereon.

2. A dough sheeting machine comprising an upright series of opposed rollers in pairs and adapted to progressively thin the dough sheet, means for driving the rollers at speeds corresponding to the progressive thinning of the dough sheet, and means in the path of the dough sheet traveling from one pair of rollers to another for supporting the dough sheet and opposing the action of gravity thereon, said last-named means comprising deflecting devices in the path of the dough sheet for diverting it to opposite sides of the direct line of travel between the sets of rollers.

3. A dough sheeting machine comprising an upright series of pairs of opposed rollers, flour receptacles adjacent to the rollers and discharging beneath the rollers, each receptacle having its discharge end provided with a gauze covering, and a rotatable brush adjacent to the discharge end of each flour receptacle causing the discharge of flour and its projection against the dough sheet after having passed between the rollers above the discharge end of the flour receptacle.

4. In a dough sheeting machine, dough thinning rollers, flour receptacles having discharge ends below the rollers with each receptacle having its discharge end covered with gauze, and a rotatable brush adjacent to the gauze and positioned with reference to a dough sheet discharged from the rollers to direct flour thereupon.

5. In a dough sheeting machine, dough thinning rollers, flour receptacles having discharge ends below the rollers with each receptacle having its discharge end covered with gauze and positioned with reference to a dough sheet discharged from the rollers to direct flour thereupon, each flour receptacle having its discharge end movable toward and from the brush for determining the quantity of flour discharged.

6. In a dough sheeting machine, sheet producing rollers, flour receptacles adjacent to the rollers and each having a discharge end beneath a respective roller, a rockable support for the receptacle, and a rotatable brush in fixed position at the discharge end of the receptacle with said receptacle having at its discharge end a gauze covering in position to be acted upon by the brush.

7. A dough sheeting machine having an upright series of pairs of sheet-forming rollers through which the dough is caused to travel, dough supporting members between the pairs of rollers and associated to deflect the direct course of travel from a pair of rollers to the next lower one, and flour receptacles and discharging means therefor associated with the rollers to direct flour upon opposite sides of the forming dough sheet after having passed the supporting means and before reaching the next lower pair of rollers.

8. In a dough sheeting machine, pairs of associated rollers for treating the dough sheet, said pairs of rollers being arranged in an upright series with the dough under treatment passing from a pair of rollers to the next lower pair, and diverting means between a pair of rollers and the next lower pair and arranged in the path of the traveling sheet of dough for supporting the sheet of dough in its passage from one pair of rollers to the next pair in order.

9. In a dough sheeting machine, pairs of associated rollers for treating the dough sheet, said pairs of rollers being arranged in an upright series with the dough under treatment passing from a pair of rollers to the next lower pair, and diverting means between a pair of rollers and the next lower pair and arranged in the path of the traveling sheet of dough for supporting the sheet of dough in its passage from one pair of rollers to the next pair in order, said diverting means comprising shelves with convexly curved dough engaging edges extending to respectively opposite sides of the direct path of the dough from one pair of rollers to the next lower one.

10. In a dough sheeting machine, pairs of associated rollers for treating the dough sheet, said pairs of rollers being arranged in an upright series with the dough under treatment passing from a pair of rollers to the next lower pair, and diverting means between a pair of rollers and the next lower pair and arranged in the path of the traveling sheet of dough for supporting the sheet of dough in its passage from one pair of rollers to the next pair in order, said diverting means comprising shelves with convexly curved dough engaging edges extending to respectively opposite sides of the direct path of the dough from one pair of rollers to the next lower one, and scrapers associated with the rollers for removing clinging dough therefrom before and directing such dough upon the shelves.

11. In a dough sheeting machine, superposed pairs of dough engaging rollers and flour directing means lodged between a pair of rollers and the next lower pair on opposite sides of the sheet of dough traveling between the pairs of rollers, said flour directing means each comprising a receptacle for flour provided with a downwardly inclined discharge neck or nozzle terminating in a lip, and having a gauze closure at the lower end, and a rotatable brush in position to engage the gauze and rotatable in a direction to cause flour to be discharged through the gauze and thrown upon the corresponding face of the sheet of dough in passing between the pairs of rollers.

12. In a dough sheeting machine, superposed pairs of dough engaging rollers and flour directing means lodged between a pair of rollers and the next lower pair on opposite sides of the sheet of dough traveling between the pairs of rollers, said flour directing means each comprising a receptacle for flour provided with a downwardly inclined discharge neck or nozzle terminating in a lip, and having a gauze closure at the lower end, and a rotatable brush in position to engage the gauze and rotatable in a direction to cause flour to be discharged through the gauze and thrown upon the corresponding face of the sheet of dough in passing between the pairs of rollers, said flour receptacle having means for adjusting the gauze toward and from the brush.

13. In a dough sheeting machine, superposed pairs of dough engaging rollers and flour directing means lodged between a pair of rollers and the next lower pair on opposite sides of the sheet of dough traveling between the pairs of rollers, said flour directing means each comprising a receptacle for flour provided with a downwardly inclined discharge neck or nozzle terminating in a lip, and having a gauze closure at the lower end, and a rotatable brush in position to engage the gauze and rotatable in a direction to cause flour to be discharged through the gauze and thrown upon the corresponding face of the sheet of dough in passing between the pairs of rollers, said flour receptacle having means for adjusting the gauze toward and from the brush, said adjusting means comprising supports for the receptacle, a centrally located pin carrying the support, and set screws on opposite sides of the pin to cause a rocking of the support on said pin and a corresponding adjustment of the discharge end of the flour receptacle.

14. A dough sheeting machine comprising a series of superposed pairs of dough treating rollers, a mandrel for carrying a sheet of dough rolled thereon, and a carrier for the mandrel with the sheet of dough thereon consisting of a shelf arranged above the uppermost pair of rollers and having means for receiving and retaining the mandrel with the dough thereon.

15. A dough sheeting machine comprising a series of superposed pairs of dough treating rollers, a mandrel for carrying a sheet of dough rolled thereon, and a carrier for the mandrel with the sheet of dough thereon consisting of a shelf arranged above the uppermost pair of rollers and having means for receiving and retaining the mandrel with the dough thereon, said shelf being provided with a pivotal support adjacent to the upper set of rollers with means for varying the inclination of the shelf about the pivotal support.

16. A dough sheeting machine comprising an upright series of pairs of rollers arranged to successively treat a sheet of dough to progressively reduce its thickness, means located below the last pair of rollers in order for receiving the dough sheet when reduced to the desired thickness, and trimming means in the path and engaging opposite faces of the dough sheet and located between the last pair of rollers in order and the receiving means for trimming the edges of the formed dough sheet to reduce it to even width before reaching the receiving means.

17. A dough sheeting machine comprising a series of pairs of dough treating rollers, a traveling apron for receiving the dough sheet delivered from the dough treating rollers, trimming means for the dough sheet engaging opposite faces thereof and located between the dough treating rollers and the traveling apron and arranged to trim off the edges of the formed sheet to reduce it to constant width, and means associated with the trimming means for diverting the trimmed off portions to a suitable point of disposal before reaching the traveling apron.

18. A dough sheeting machine comprising a series of pairs of associated dough treating rollers, a traveling apron for receiving the dough sheet, trimming means for the dough sheet engaging opposite faces thereof and located above the apron and arranged to trim off the edges of the formed sheet to reduce it to constant width before reaching the apron, and means for diverting the trimmed off portions to a suitable point of disposal, said last-named means comprising other aprons in the path of such trimmed off portions and having a direction of travel opposite to that of the first-named apron.

19. The combination with a dough sheeting machine having means for progressively forming the dough into sheets of predetermined lengths, of a gathering roller for the sheets of a length substantially the same as the width of the sheets and provided with means for picking up the forward end of a progressive sheet of dough.

20. The combination with a dough sheeting machine having means for progressively forming the dough into sheets of predetermined lengths, of a gathering roller for the sheets comprising a frame with a manipulating handle and an elongated roller with studs thereon, the length of the roller being substantially that of the width of the dough sheets being formed.

In testimony, that we claim the foregoing as our own, we have hereto affixed our signatures in the presence of two witnesses.

OLE C. NUUBSON.
JOHAN A. NUBSON.

Witnesses:
S. MORTENED,
E. HATLEY.